Nov. 5, 1935. W. SEELEY 2,020,082
NONSKID CHAIN
Filed Jan. 24, 1935
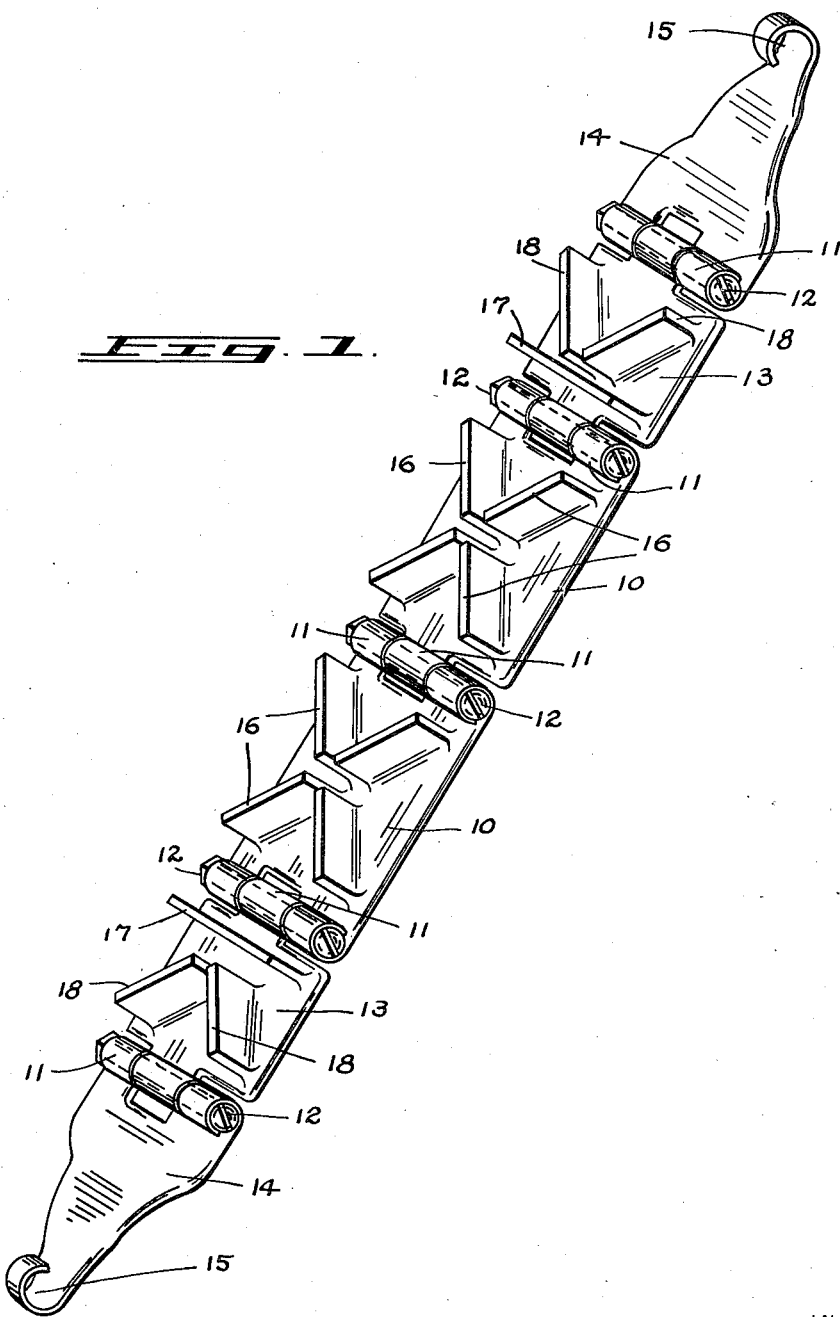
INVENTOR
Wilson Seeley
By Ralph Burch
Attorney Patented Nov. 5, 1935

2,020,082

UNITED STATES PATENT OFFICE 2,020,082

NONSKID CHAIN

Wilson Seeley, Ivanhoe, Ontario, Canada

Application January 24, 1935, Serial No. 3,344

2 Claims. (Cl. 152—14)

This invention relates to new and useful improvements in a nonskid tread, for an automobile tire to be secured thereon individually by adjustable strap means or a plurality of the same may be secured on a tire by means of periphery chains.

The object of the invention is to devise and construct a nonskid tread member that will be equally efficient in either direction of travel.

A further object of the invention is to construct the tread members sufficiently small that a number thereof may be used to span the tread of a tire, the same being hinged together in a manner to provide flexibility to the assembled unit in correspondence with the pneumatic tire of an automobile wheel.

With these and other objects in view that may appear while the description proceeds the invention consists in the novel construction and arrangement of parts as hereinafter more specifically set forth, claimed and shown in the accompanying drawing forming part of this application and in which the figure is a perspective view of my improved nonskid tread.

Referring more in detail to the drawing in which similar reference characters designate corresponding parts throughout the several views it will be seen the invention comprises members 10 rectangular in shape having looped ends 11 whereby they are hinged together and a hinge bolt 12 is positioned through the said loops to secure the members together. Connected in a similar manner on the outer ends of each of the aforesaid members 10 are outer tread members 13 being of the same width as the members 10 but approximately half the length thereof, and on the outer ends of these members are link connecting members 14, being hinged thereto in a similar manner to the hinged connecting device as previously described. The outer end of the said link members 14 are provided with a loop 15 by means of which they are connected to a strap or periphery chain or other means securing the same on the tire of an automobile.

On the central members 10 are flanges 16 radiating from a point adjacent the center thereof toward each of the four corners of the said member. Said flanges projecting from said members which form the base therefor, in a plane at right angles to the plane of the said base and are constructed integral therewith.

The smaller tread members 13 are provided with a flange 17 extending at right angles from the base thereof in a lateral direction across the width of the said member and adjacent the inner end thereof. Two additional flanges 18 are also constructed thereon in a similar manner and extend diagonally from a point adjacent the center of the flange 17 toward the outer corners of the member.

It will be readily seen that on account of the hinged joints the assembled tread will be flexible to move with the surface of the inflated pneumatic automobile tire against which the bases rest and that the diagonal flanges will grip any surface immaterial of which way the device is placed on the tire or the direction in which the wheel revolves. The outer tread members in addition to the foregoing also prevent side motion or skid by means of the lateral flange 17, which will always be in line with the direction of travel.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. In a nonskid tread as described comprising two central rectangular members hinged together, the length thereof being greater than the width, flanges projecting at right angles to the plane of the base of the said members, said flanges extending diagonally from a point adjacent the center thereof and terminating adjacent the corners of the said member, and two outer tread members, the length thereof being approximately half that of the aforesaid central members, said outer members having a lateral flange thereon extending across the width of the base of the said member and adjacent the inner end thereof, and diagonal flanges extending from a point adjacent the center of the aforesaid lateral flange and terminating at the outer corners of the said base.

2. In a nonskid tread as described comprising two central rectangular members hinged together, the length thereof being greater than the width, flanges projecting at right angles to plane of the base of the said members, said flanges extending diagonally from a point adjacent the center thereof and terminating adjacent the corners of the said member, and two outer tread members, the length thereof being approximately half that of the aforesaid central members, said outer members having a lateral flange thereon extending across the width of the base of the said member and adjacent the inner end thereof and diagonal flanges extending from a point adjacent the center of the aforesaid lateral flange and terminating at the outer corners of the said base, and hook members hinged on the outer ends of the said tread member providing means whereby the structure may be secured on an automobile tire, substantially as set forth.

WILSON SEELEY.